United States Patent [19]

Damin et al.

[11] Patent Number: 4,937,007

[45] Date of Patent: Jun. 26, 1990

[54] PROCESS FOR INHIBITING THE DEPOSIT OF PARAFFINS IN CRUDE OILS AND PETROLEUM SECTIONS UTILIZING N-SUBSTITUTED SUCCINIMIDE ETHERS

[75] Inventors: Bernard Damin, Oullins; Alain Faure, Saint Chamond; Paul Maldonado, Saint Symphorien d'Ozon; Jean-Luc Volle, Salies du Salat, all of France

[73] Assignee: Societe Nationale Elf Aquitaine, Courbevoie, France

[21] Appl. No.: 630,014

[22] Filed: Jul. 12, 1984

[30] Foreign Application Priority Data

Jul. 21, 1983 [FR] France ................................. 83 12074

[51] Int. Cl.$^5$ ................................................ C01L 1/22
[52] U.S. Cl. ...................................... 252/8.3; 548/544; 548/546; 548/547
[58] Field of Search ...................... 252/8.55 R, 8.3, 95, 252/8.55 B, 51.5 A, 47.5, 99, 102, 186.42, 186.41; 544/309, 312; 564/48, 55, 59; 546/220; 137/13–15; 166/304

[56] References Cited

U.S. PATENT DOCUMENTS

| | | | |
|---|---|---|---|
| 2,981,683 | 4/1961 | Simpson et al. | 252/8.3 |
| 3,244,188 | 4/1966 | Parks et al. | 252/8.3 |
| 3,928,223 | 12/1975 | Murray | 252/186.39 |
| 4,005,020 | 1/1977 | McCormick | 252/8.3 |
| 4,045,360 | 8/1977 | Fischer et al. | 252/8.3 |
| 4,303,535 | 12/1981 | Chou | 252/51.5 A |
| 4,329,239 | 5/1982 | Chou | 252/51.5 A |
| 4,422,856 | 12/1983 | Maldonado et al. | 44/63 |

OTHER PUBLICATIONS

CA 98: 182465j, "Additives for Use as Cloud Point Depressants . . . ", Maldonado et al., Abstract of EP 71,513.

CA 96: 184095w, "Additive Compositions . . . ", Maldonado et al., Abstract of BE 890,385.

*Primary Examiner*—Barry S. Richman
*Assistant Examiner*—T. J. Wallen
*Attorney, Agent, or Firm*—Burgess, Ryan & Wayne

[57] ABSTRACT

A process for inhibiting the deposit of paraffins in crude oils and petroleum fractions incorporating additives of the family of N-substituted succinimide ethers. The additives according to the invention make it possible, on the one hand, to maintain in dispersion the whole range of paraffins improving the flowing properties of crude oils and, on the other, to prevent the deposit of the heavier paraffins on the walls. Therefore, the process is effective during both the storage and the transportation of crude petroleum.

8 Claims, No Drawings

PROCESS FOR INHIBITING THE DEPOSIT OF PARAFFINS IN CRUDE OILS AND PETROLEUM SECTIONS UTILIZING N-SUBSTITUTED SUCCINIMIDE ETHERS

This invention concerns itself with a process of inhibiting the deposit of paraffins in crude oils and petroleum fractions.

BACKGROUND OF THE INVENTION

Crude oils may contain considerable amounts of paraffins tat vary according to the nature of the crude oil. At the temperature of the wells, these paraffins dissolve in the crude oil and are in liquid state. When the crude oil rises to the surface, and mainly during its transportation and storage, its temperature decreases and the paraffins crystallize in the form of scales or needles. The crystallization of the paraffins decreases the flow properties of the crude oils and their pumpability. At the same time, the heavier paraffins agglomerate in the form of nets on the cold walls and cause the formation of deposits in the conduits and reservoirs. The accumulation of these deposits results in considerable losses of production. In narrow passages, there is even the risk of a complete obstruction.

Numerous process have been proposed for the solution of the aforesaid problems. There are mechanical processes consisting in scraping the inner walls of conduits and reservoirs. It is evident that, aside from the high cost of this process, its use is often impossible as well as impractical.

There has likewise been suggested the use of so-called paraffin-inhibitor additives the purpose of which is to delay the crystallization of the paraffins and above all to prevent the agglomeration of crystals formed on the walls.

Paraffin inhibitors are usually olefin polymers or copolymers. But the polymer products involve a certain number of inconveniences. Their polymeric structure makes them sensitive to shear. They serve well as crystallization inhibitors when the crude oil is not subjected to shear, but the forces exerted in the conduits during transportation of the crude oil by pumping cancel their effects.

The object of this invention is therefore to provide a process that remains effective during both the storage and the transportation of crude petroleum. The additives according to the invention make it possible, on the one hand, to maintain in dispersion the whole range of paraffins, improving the flowing properties of the crude oils and, on the other, to prevent the deposit of the heavier paraffins on the walls.

BRIEF SUMMARY OF THE INVENTION

The process according to the invention comprises incorporating, in the paraffinic crude oils, additives of the family of N-substituted succinimide ethers in a concentration by weight usually between about 5 and 3000 ppm.

The N-substituted succinimide ethers according to the invention correspond to one or another of the following formulae

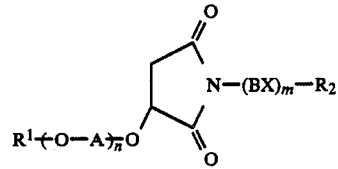

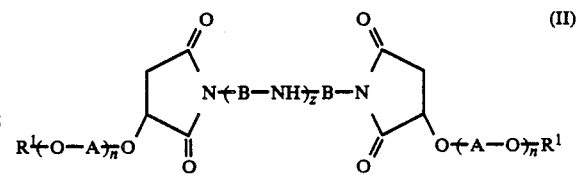

wherein $R^1$ and $R^2$ represent each an aliphatic, linear or branched, saturated or unsaturated, radical, containing from to 25 carbon atoms and preferably from 12 to 25 carbon atoms; A and B each represent a linear or branched alkylene radical containing from 2 to 4 carbon atoms of which at least two are a straight chain; X represents an —NH— group or an oxygen atom —O—;

n is an integer from 1 to 50;

m is an integer from 0 to 4; and

DETAILED SUMMARY OF THE INVENTION

The compositions useful in the present invention corresponding to formulae I and II can be obtained by reaction of at least one anhydride corresponding to the formula

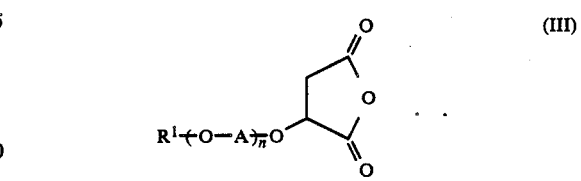

with an amine of the formula:

or the formula

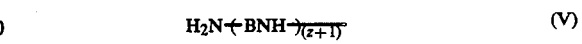

The anhydride of formula (III) can be obtained by reacting maleic anhydride with at least one oxyalkylated secondary or tertiary alcohol corresponding to the formula:

In the above formulae (III), (IV), (V) and (VI), A, B, $R^1$, $R^2$, n, m, z, X each have the same meaning as before.

Among the oxyalkylated alcohols of formula (VI) useful for preparing the anhydrides of formula (III), particularly preferred examples include:

polyoxypropylated lauric alcohol including, for example, 21 propylene oxide moieties trioxypropylated tridecylic alcohol oxypropylated oxyethylated tridecylic alcohol.

Among the amines of formula (IV) useful for preparing the products of formula (I) of the invention, particularly preferred examples include:

N-oleyl propanediamine of the formula $C_{18}H_{35}NH-(CH_2)_3-NH_2$;

N-isotridecyl propanediamine of formula $C_{13}H_{27}NH-(CH_2)_3-NH_2$;

3-isotridecyloxy-1-propylamine of the formula $C_{13}H_{27}-O-(CH_2)_3-NH_2$;

3-undecyloxy-1-propylamine of the formula $C_{11}H_{23}-O-(CH_2)_3-NH_2$;

3-tridecyloxy-1-propylamine of the formula $C_{13}H_{27}-O-(CH_2)_3-NH_2$;

3-(2-ethyl-hexyl) oxy-1-propylamine of the formula

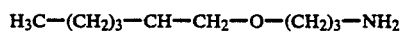

$$H_3C-(CH_2)_3-CH-CH_2-O-(CH_2)_3-NH_2$$
$$|$$
$$CH_2$$
$$|$$
$$CH_3$$

Among the diamines of formula (V) useful for preparing the products of formula (II) of the invention, particularly preferred examples include:
ethylene diamine;
diethylene triamine;
tetraethylene pentamine;
dipropylene triamine; and
tetrapropylene pentamine.

The compositions useful in the present invention, can be prepared by the condensation of the reagents without using a solvent; preferably the condensation is carried out in a solvent, such as an aromatic hydrocarbon having a boiling point between about 70° C. and 200° C. at the boiling point of the solvent to eliminate the water formed in the course of the reaction.

The reaction temperature is usually between about 65° C. and 200° C. and preferably between about 80° and 160° C. The duration of the reaction is between about 0.5 and 6 hours and preferably between about 1 hour and 3 hours.

The amines of formula (IV) are generally used in an amount of from about 1.02 to 1.2 moles, and preferably from about 1.05 to 1.1 moles per mole of anhydride of formula (III).

For obtaining the products of the invention, it is likewise possible to condense in one step the maleic anhydride, the oxyalkylated alcohol of formula (VI) and the amine of formula (IV) or (V).

The structure of the "N-substituted succinimide ethers" useful in the invention can be confirmed by infrared spectrometry; the infrared spectra shows succinimide absorption bands at 1700 cm$^{-1}$ and ether absorption bands at 1110 cm$^{-1}$.

More precise information about these products and the synthesis thereof is given in French patent application No. 80/03459 (publication No. 2,476,119) filed on Feb. 15, 1980.

The quantity of paraffin inhibitors required depends on the properties of the crude oil being treated and the temperature at which the oil is cooled. The products useful in the practice of the invention are added to the crude oils in a concentration by weight between about 5 and 3000 ppm, preferably between about 100 and 2000 ppm.

Although the process is particularly adapted to the treatment of crude oils, it is also useful for treating petroleum fractions containing paraffins.

The effectiveness of the process of the invention has been tested both in the laboratory and in the field.

The examples which follow illustrate the invention without limiting it.

EXAMPLE I

In a two-liter reactor there are introduced 715 g (0.5 mole) monolauryl-ether of the glycol polypropylene (that is, the polyoxypropylated lauric alcohol containing about 21 propylene oxide moieties per molecule), followed by heating, with stirring, under nitrogen, at 185° C. 53.9 g (0.55 mole) maleic anhydride are then added and reaction is continued for 15 hours at 185° C. under nitrogen.

After cooling, there is recovered a yellow-orange oil having an I.R. spectra that corresponds to the structure of an alpha-polypropoxylated succinic anhydride.

153.8 g of this oil are added to a solution of 39.6 g (0.12 mole) of N-oleyl propanediamine in 250 ml xylene. The mixture is heated under reflux for 3½ hours at 144° C. with azeotropic distillation of the water formed in the course of the reaction. There are obtained 378 g of a 50% solution in xylene of a product in which the structure of alpha-polypropoxylated N-alkenyl-succinimide is confirmed by I.R. spectrometry.

EXAMPLE II

There are dissolved in a 500 ml reactor 9.8 g (0.1 mole) maleic anhydride and 145 g (0.1 mole) mono-lauryl-ether of polypropylene glycol (that is, polyoxypropylated lauric alcohol containing about 21 propylene oxide moieties per molecule) in 150 ml xylene. After heating for 3 hours at reflux, the mixture was cooled to room temperature, then 36 g (0.1 mole) N-oleyl propane diamine were added.

The mixture was again heated for 3 hours under reflux at 145° C. with azeotropic extraction of the water formed.

There is obtained a 50% solution in xylene of a product having a structure which, evidenced by I.R. spectrometry, is identical to the one obtained in the preceding example.

EXAMPLE III

There are carried out the same operations described in Example I prior to adding to 153.8 g oil formed in the first step, constituting the polypropoxylated succinic anhydride, a solution of 9.90 g (0.06 mole) tetraethylene pentamine in 250 ml xylene. The mixture is heated under reflux for 3½ hours at 144° C. with azeotropic distillation of the water formed in the course of the reaction. There is obtained a 50% solution in xylene, the expected product alpha-polypropoxylated triamino-bis-succinimide was confirmed by I.R. spectrometry.

EXAMPLE IV

The effectiveness of the process of the invention has been verified in the laboratory by tests of paraffin deposits on the cold surfaces immersed in crude petroleum. There is immersed in the crude petroleum kept at its production temperature a cell including two plates the temperature of which are fixed 20° C. below that of the crude oil.

The results are obtained from the comparison of the weights of deposit gathered on the virgin crude petroleums and of crude petroleums containing the additives according to the invention.

The amount (E) representative of the effectiveness of the additives is defined by the equation:

$$E = \frac{E_1 - E_2}{E_1} \cdot 100$$

wherein
$E_1$ = weight of the virgin crude deposit
$E_2$ = weight of the crude deposit containing the additives according to the invention.

Characteristics of the crude oils tested

| | Gabon | South West France | Parisian basin France |
|---|---|---|---|
| Volumetric mass 15° C. Kg/m³ | 810 | 901 | 855 |
| Flow point °C. | 32 | −12 | −12 |
| Paraffin contents % by weight (1) | 26,9 | 4,75 | 11,8 |
| Asphaltene contents % by weight | 0,18 | 2,75 | 0,01 |
| Viscosity CST | 6,75 (50°) 8,5 (60°) | 41,3 (20°) 18,3 (40°) 7,5 (70°) | 17,4 (20°) 8,7 (40°) |

(1) The paraffins content is determined by extraction with methyl isobutylketone followed by a crystallization at −30° C. The asphaltenes must first be eliminated by adsorption on bleaching earths.

Effectiveness of the additives with the different crude oils

| Additive | Conc. in ppm | Gabon | South West France | Parisian basin France |
|---|---|---|---|---|
| According to Example I | 100 | 25 | 29 | 48 |
| | 300 | 31 | 43 | 52 |
| | 1000 | 38 | 49 | 59 |
| According to Example II | 100 | 17 | 39 | 65 |
| | 300 | 25 | 49 | 70 |
| | 1000 | 29 | 56 | 75 |
| According to Example III | 100 | 25 | 38 | 76 |
| | 300 | 38 | 53 | 79 |
| | 1000 | 40,5 | 57 | 88 |

EXAMPLE V

This example demonstrates the effectiveness of the additives according to the invention in the inhibition of the deposit of heavy paraffins.

The paraffins are deposited on a cold plate according to the method described in Example IV. The deposits are weighed and the distribution by molecular weight is determined by chromatography.

The table herebelow summarizes the reduction (R) in percent of the weights of the heavy N-paraffins in the deposits of a crude oil of the Parisian basin containing 100 ppm of the additive prepared according to Example III in relation to the same non-treated crude oil. The $\geq C_{40}$ paraffins are entirely eliminated.

| Length of Chain | R % by weight |
|---|---|
| $C_{20}$ | 80 |
| $C_{24}$ | 86,7 |
| $C_{28}$ | 93 |
| $C_{30}$ | 94 |
| $C_{32}$ | 95 |
| $C_{36}$ | 96 |
| $C_{40}$ | 100 |
| $C_{44}$ | 100 |

What is claimed is:

1. A process for inhibiting the deposit of paraffins in crude oils which comprises incorporating into th oil a paraffin deposit inhibiting amount of and N-substituted succinimide ether of the formulae:

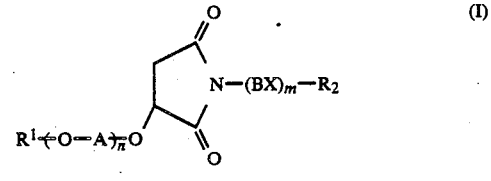

and

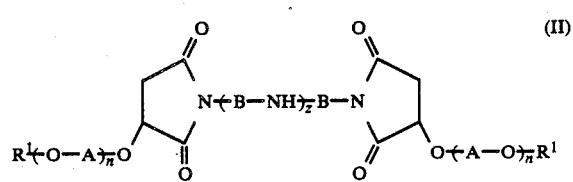

wherein $R^1$ and $R^2$ each independently represent a linear saturated aliphatic radical containing 1 to about 25 carbon atoms, a linear unsaturated aliphatic radical containing 2 to about 25 carbon atoms, a branched saturated aliphatic radical containing 3 to about 25 carbon atoms and a branched unsaturated aliphatic radical containing 3 to about 25 carbon atoms, A and B each independently represent a linear alkylene radical containing from 2 to 4 carbonatoms, a branched alkylene radical containing from 3 to 4 carbon atoms;

X represents an —NH— group or an oxygen atom —O—;

n is an integer from 1 to 50;

m is an integer from 0 to 4; and z is an integer from 0 to 5.

2. A process according to claim 1, wherein $R_1$ and $R_2$ represent a linear or branched aliphatic radical containing from 12 to 25 carbon atoms.

3. A process according to claim 1, wherein $R_1$ and $R_2$ represent a linear aliphatic radical containing 18 carbon atoms.

4. A process according to claim 1, wherein said additive is incorporated into the oil in a concentration by weight varying between about 5 and 3000 ppm.

5. A process according to claim 4, wherein the additive is present in an amount varying between about 100 and 2000 ppm.

6. The process of claim 1, wherein the N-substituted succinimide ether is the reaction product of an alpha-polypropoxylated succinic anhydride with N-oleyl propanediamine in a mole ratio of about 2:1.

7. The process of claim 6, wherein the polypropoxylated succinic anhydride contains about 21 propylene oxide moieties.

8. The process of claim 1, wherein the N-substituted succinimide is an alpha-polypropoxylated triamino-bis-succinimide.

* * * * *